United States Patent [19]

Makino et al.

[11] 4,056,782
[45] Nov. 1, 1977

[54] WIRE TRANSMISSION NOISE SUPPRESSOR FOR A VEHICLE

[75] Inventors: Takayuki Makino, Okazaki; Teruo Yamanaka, Toyota; Yoshitaka Kuroyanagi, Toyota; Tatsuo Teratani, Toyota, all of Japan

[73] Assignee: Toyota Jidosha Kogyo Kabushiki Kaisha, Toyota, Japan

[21] Appl. No.: 629,363

[22] Filed: Nov. 6, 1975

[30] Foreign Application Priority Data

July 31, 1975 Japan .................................. 50-29180

[51] Int. Cl.² ............................................. H04B 1/18
[52] U.S. Cl. .................................. 325/313; 343/711; 325/379

[58] Field of Search ............... 343/180, 711, 723, 834, 343/838, 841, 912, 913, 911; 325/65, 312, 313, 379, 386, 377

[56] References Cited

U.S. PATENT DOCUMENTS

| | | | |
|---|---|---|---|
| 2,640,916 | 6/1953 | Espley | 343/180 |
| 3,793,590 | 2/1974 | Etling et al. | 325/312 |

Primary Examiner—Benedict V. Safourek

[57] ABSTRACT

A noise suppressor for a vehicle including a branch circuit of low impedance connected to an electrical circuit through which a high frequency current passes in a standing wave. The branch circuit is connected at approximately a point corresponding to a node of the standing wave, and is of a length related to the wavelength of the current.

7 Claims, 8 Drawing Figures

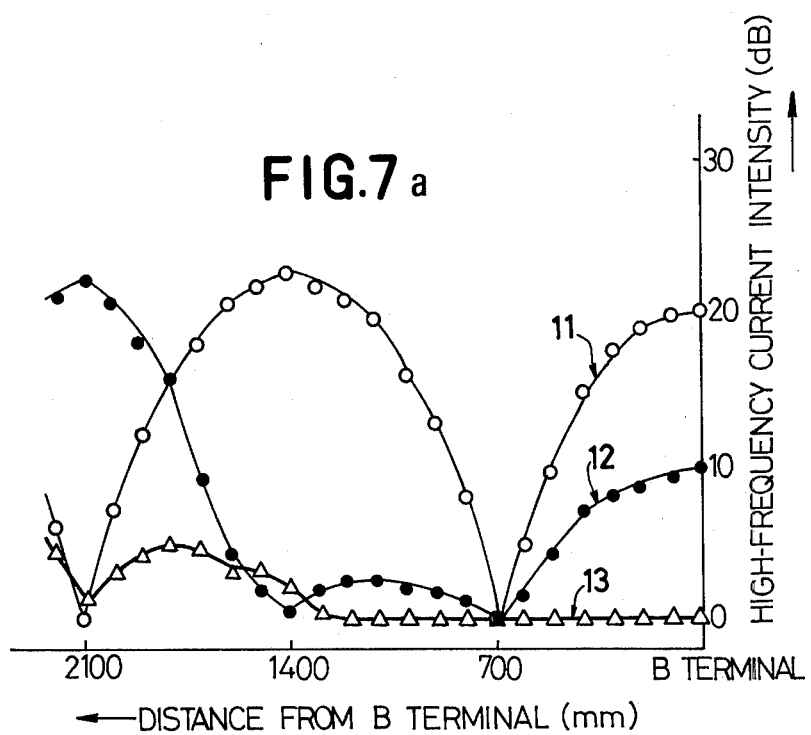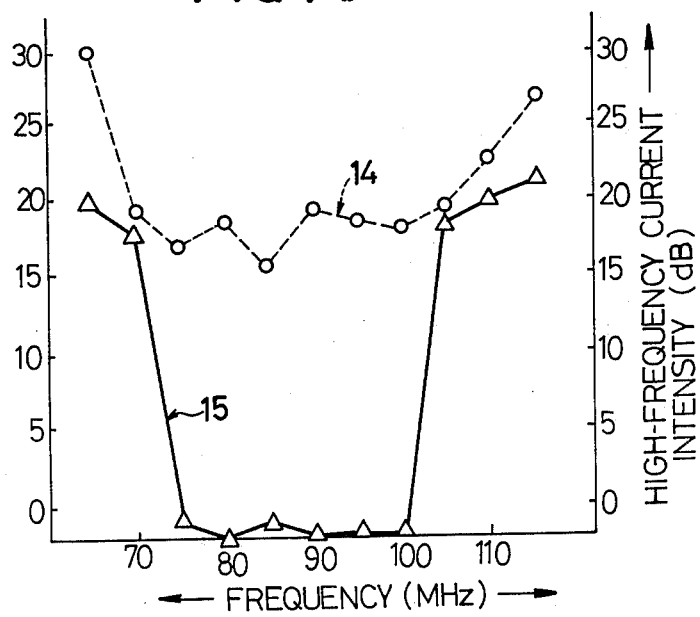

WIRE TRANSMISSION NOISE SUPPRESSOR FOR A VEHICLE

BACKGROUND OF THE INVENTION

The present invention relates to a suppressor of such noise as causes a variety of negative effects on electronic equipment in a vehicle.

Electronic devices placed in an automobile such as an FM radio receiver, a radio communications facility, and an electrically controlled fuel injection device, have recently come to be operated on a signal in the high-frequency range. The said devices are effected by the high-frequency current generated by an ignition system, a voltage regulator, and/or various kinds of switches including a horn relay, until noise is generated. The device thus effected is caused to be put in improper operation, and it normal function is suspended, requiring some proper countermeasures to correct the problem. In the conventional practice, no special attention has been given to the high-frequency properties of noise. For example, a noise suppressor such as a capacitor was set in place across the source of generation of the high-frequency current. In case a high-frequency current was deemed to have been generated secondarily in a wire by induction, either the wire was separated in terms of distance, or a shielded cable was specifically employed therefor, thus making the electrostatic coupling looser. However, the said measures have still involved numerous difficulties so that no desirable effects have been achieved, cost was increased, and/or no sufficient space or clearance for making the coupling loose enough could be obtained in a desirable manner.

BRIEF SUMMARY OF THE INVENTION

The present invention was developed, with the above mentioned points duly taken into account, for the purpose of providing means for preventing such a highfrequency current as would possibly constitute a cause or a source of noise, from being transmitted to any electrical circuit arranged in the area adjacent to the electronic device in question, by connecting a branch circuit of low impedance to the electrical circuit, and arranged at a position corresponding to the node of the standing wave formed on said electrical circuit by the high-frequency current.

DETAILED DESCRIPTION OF THE INVENTION

Figure 1:
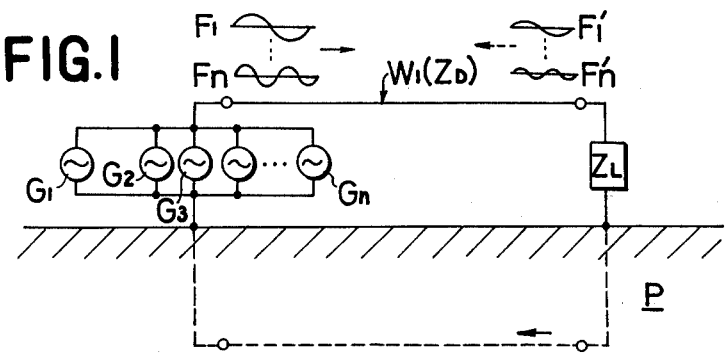
FIG. 1 is an explanatory view specifically prepared for the purpose of showing the generation and the transmission of a high-frequency current.
Figure 2:
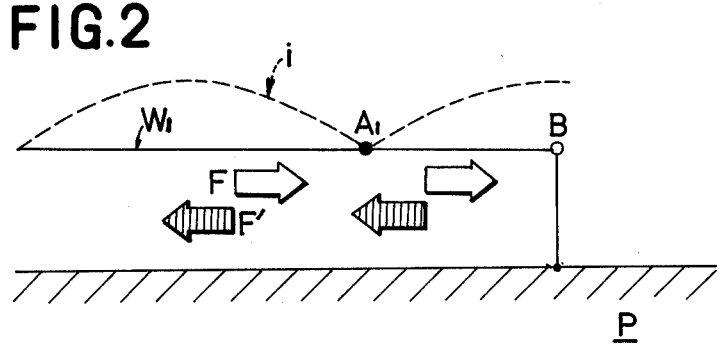
FIG. 2 is an explanatory view to show the process wherein a standing wave is formed by a highfrequency current.

A detailed description of the present invention will now be given below, making reference to the drawings attached hereto. FIG. 1 and FIG. 2 illustrate the generation of a standing wave in an electrical circuit of an automobile which has a power source properly grouned at one end thereof. In case the length of the electrical circuit is equivalent to, or in excess of, the wavelength of a high-frequency current, it is imperative to handle the said electrical circuit as a distributed constant circuit. In the drawings, $G_1 \sim G_n$ represent the sources of generation of high-frequency currents $F_1 \sim F_n$, respectively, the frequencies being different from one another, $W_1$ represents a wire, $Z_L$ represents a load which is connected to the receiving end of the wire $W_1$, and P represents a planar conductor which constitutes the return for noise currents $F_1 \sim F_n$. Now, suppose the characteristic impedance of the wire $W_1$ is $Z_0$ and the impedance of the load $Z_L$ is $Z_L$, for a certain frequency $f_0$; in case $Z_0$ and $Z_L$ are not properly matched, reflected waves $F'_1 \sim F'_n$ are generated, thus forming a standing wave. This state is shown in FIG. 2.

In FIG. 2 when the wire $W_1$ is short-circuited at its receiving end B to a planar conductor P constituting a return, B, a reflected wave F' is generated at the receiving end B with respect to an incident wave F transmitted through the wire $W_1$ due to the absence of proper matching of the impedances. By the synthesization of the incident wave F with the reflected wave F', a standing wave is caused to form, and constitutes a node at the point $A_1$ and a loop at the point B, with the intensity of the high-frequency current at respective points of the wire being shown by the symbol $i$. In this case, the impedance as seen towards the side of the load varies a great deal with the position at respective points of the wire $W_1$; to put it otherwise, the impedance is quite high in level at the node of the standing wave, while the impedance is quite low in level at the position of the loop.

Figure 3:
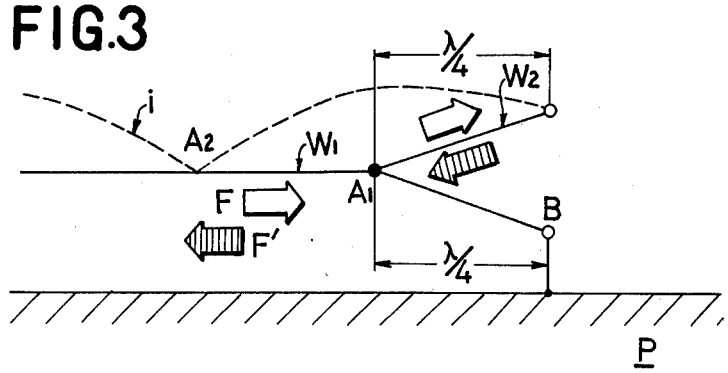
FIG. 3 is an explanatory view to show the principle of the present invention.

As shown in FIG. 3, the wire $W_1$ having a short-circuit load at the end B is connected at the point $A_1$ constituting a node of the standing wave with a branch circuit $W_2$ of low impedance, hereinafter referred to as a noise trap wire. For example, the wire can have an open end at the receiving end and be of the length $$\frac{\lambda}{4} + \frac{\lambda}{2} \times n \, (n = 01, 2, 3, \ldots)$$

or of a short circuited end and being of the length $\lambda/2 \times (n+1)$, $(n=0, 1, 2, 3, \ldots)$ Ideally, the node is a distance of $$\frac{\lambda}{4} + \frac{\lambda}{2} \times n \, (n = 0, 1, 2, \ldots)$$

from the short-circuited end B. Here, $\lambda$ represents the carrier wavelength for the frequency $f_0$ of the high-frequency current. With the branch $W_2$, the impedance on the loaded side of the wire $W_1$ (on the side of the terminal B) is quite high in level, while the impedance on the side of the noise trap wire $W_2$ is quite low in level, seen from the point $A_1$, so that the high-frequency current $i$ transmitted through the wire $W_1$ runs, in most part, through the noise trap wire $W_2$, thus being caused to scarcely run to the side of the terminal B. This phenomenon is not limited only to the frequency $f_0$, but will also occur in the adjacent frequency band to the frequency $f_0$, as a phenomenon taking shape in the corresponding frequency band resulting in noise suppression over a frequency band. It is noted that when the noise trap wire $W_2$ is connected at the point $A_1$, the position of the node of the standing wave is displaced as to be set at the point $A_2$.

Figure 4:
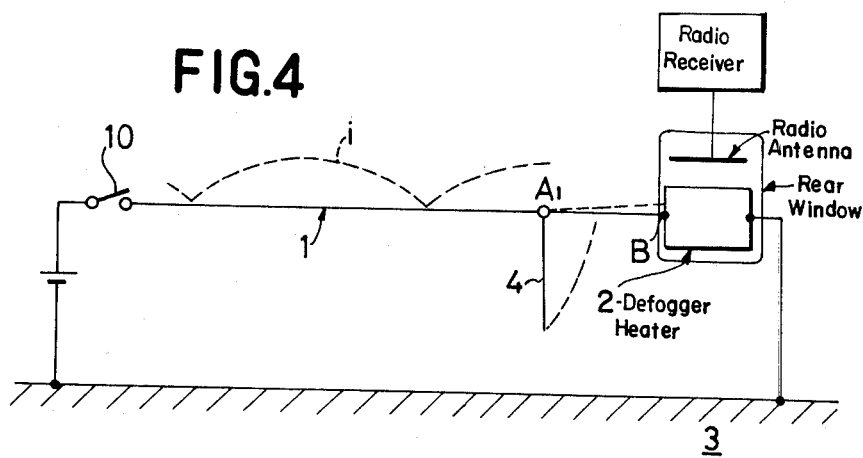
FIG. 4 is a schematic diagram to show an embodiment of the present invention.

A description will now be given below with regard to an embodiment of the present invention. In FIG. 4, 1 is a defogger wire interconnected from a switch 10 set in the front part of an automobile to a defogger heating wire 2 arranged along the rear window, 3 is a planar conductor such as the steel plate of the body of the automobile, and 4 is a noise trap wire connected to the defogger wire at a node of the standing wave of the high-frequency current formed on the defogger wire or in an area adjacent thereto. Such a high-frequency current $i$ of the FM radio band as is generated mainly by a voltage regulator is carried through the defogger wire 1. The high-frequency current $i$ electrostatically and electromagnetically carried through the said defogger wire 1 is coupled to an antenna 6 arranged along the rear window, together with the defogger heating wire 2, from the defogger heating wire 2, thus causing radio noise. In this case, the defogger wire 1 and the defogger heating wire 2 are not properly notched in terms of impedance at the terminal B, covering a standing wave to be formed. When the noise trap wire 4 is connected to the point $A_1$ constituting a node of the standing wave, or in an area adjacent thereto, the impedance on the side of the defogger heating wire 2 is quite high in level, and the impedance on the side of the noise trap wire 4 is quite low in level, as seen from the point $A_1$, so that the high-frequency current is caused, in the most part, to run through the noise trap wire 4, and will not run through the defogger heating wire 2, thus enabling the high-frequency current to be properly stopped from running into the antenna.

Figure 5:
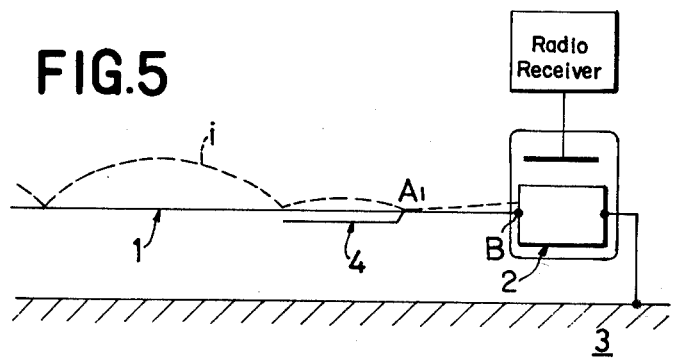
FIGS. 5 and 6 are schematic diagrams to show other embodiments of the present invention, respectively, and FIG. 7(a), (b) are graphs to show the performance and the effects to be achieved by the embodiments of the present invention.

The length $\lambda/4$ of the noise trap wire 4 shown in FIG. 4 is approximately 70 cm for an FM radio frequency of 85 MHz and about 60 cm for a frequency of 100 MHz. As shown in FIG. 5, the noise trap wire 4 is arranged along the defogger wire 1 toward the switch 10 (in the direction away from the terminal B). In this embodiment, the defogger wire 1 and the noise trap wire 4 may also be put together and rolled up in a proper manner by using a vinyl tape or the like, wherever so required, since the noise trap wire 4 is still kept intact in terms of its functions and the effects thereof. Such a construction as this has an advantage that the defogger wire 1 with the noise trap wire 2 has no additional trouble to be set on the body of an automobile, furthermore, where the defogger wire 1 and the noise trap wire 4 are arranged in a parallel manner, the phases of the high-frequency currents running through both wires function in such a manner as to counteract each other in a favorable manner, thereby mitigating the adverse effects of a high-frequency current on other wires or the like, and thus enabling the effects of noise suppression, as a whole, to be all the more enhanced.

Figure 6:
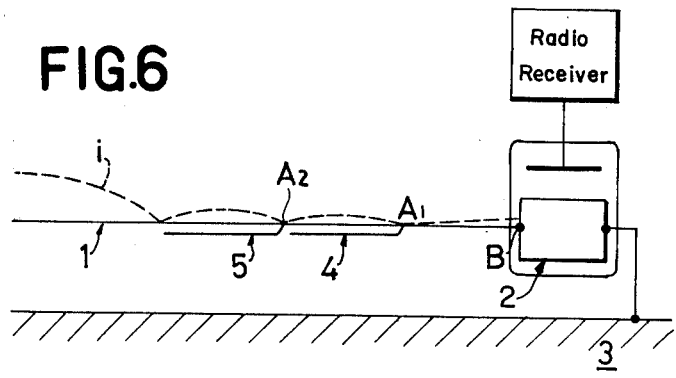

Shown in FIG. 6 is another embodiment having a secondary noise trap wire 5 further added to the embodiment shown in FIG. 4 or FIG. 5. The effects of noise suppression at the frequency $f_0$ and the frequency band adjacent thereto by making connection of the noise trap wire 4 are as described in the foregoing paragraphs furthermore, the function of noise suppression at the frequency $f_1$ ( and in the frequency band adjacent thereto as well) can be caused also be accomplished, by setting the length of the second noise trap wire 5 as corresponding to the frenquency $f_1$, and by connecting the wire 5 at the position of the node of the high-frequency current of the frequency $f_1$ or in an area adjacent thereto. As a result wherefrom, the effects of noise suppression in the frequency bands of $f_0$, and $f_1$ can be achieved in a proper manner by virtue of the first and second noise trap wires 4 and 5. Likewise, by arranging a plurality of noise trap wires, the said effects of noise suppression can be achieved. Furthermore, the length and the connecting position of the second noise trap wire 5 can also correspond to the frequency $f_0$ in the same manner as in the case of the first noise trap wire 4. To put it otherwise, in case proper connection is made at the position $A_2$, (or in an area adjacent to), which is a node of the standing wave cause by setting the first noise trap wire 4, the high-frequency current of the frequency band $f_0$ (and in the frequency band adjacent thereto as well) carried through the defogger wire 1 is caused, at first, to be carried mostly through the second noise trap wire 5 at the point $A_2$, and the residual small portion of the high-frequency current is carried through the part of the defogger wire 1 containing the point $A_1$. Furthermore, at the point $A_1$, the high-frequency current is carried, in the most part, through the first noise trap wire 4, and only a negligible portion thereof is carried through the defogger heating wire 2. Therefore, the effects of noise suppression can be quite remarkable. Since with regard to the electrical circuits arranged in an automobile, the effect of the mirror image of the body of the automobile and the wire arranged along the said body are utilized therefor, the characteristic impedance of the electrical circuits is prone to be affected by the positional relationship between the body of the automobile and the wire. However, the effects of noise suppression which are sufficient for practical purposes, can be properly obtained by the arrangement of a plurality of noise trap wires in such a manner as is set forth in the foregoing paragraphs, even where the conditions relating to the length and the method of connection of the noise trap wires are so selected as to be quite tolerant.

What is described in the Illustration introduced above with regard to the noise generated in an FM radio receiver is likewise applicable in exactly the same manner to such noise as is generated by any other high-frequency current. Besides, it also proves effective when an element of low impedance such as a capacitor or the like, is connected between the node of the standing wave and the body of the automobile in place of the noise trap wire.

Some experimental data will be shown in FIG. 7 (a) and (b) as examples of the effects of noise suppression. Shown in (a) is the intensity of the high-frequency current running through a defogger wire, wherein 11 represents the conventional case, 12 represents the case of the embodiment shown in FIG. 5, and 13 represents the case of the embodiment shown in FIG. 6. Shown in (b) is the intensity of the high-frequency current measured at the terminal B in terms of the frequency thereof, wherein 14 represents the conventional case, and 15 represents the case of the embodiment shown in FIG. 6. As learned through the results of these experiments, it is clear that the effects of suppression of noise generated by a high-frequency current, by using the transmission noise suppressor introduced by the present invention, are quite remarkable. Furthermore, in case the degree of impedance matching between a load and a transmission line is greater and the standing wave is inconspicuous, a type of noise trap wire which is sufficiently smaller in value of impedance than that of the characteristic impedance of the said transmission line can be selected for use. In summary, it goes without saying in specific terms that the basic requirements of the noise trap wire are what are to be specified, in terms of the length thereof, and in conformity with the transmission wavelength of a high-frequency current. Therefore, such a line can be of an electroconductive film formed on the coat for covering the conductive path (for instance, the said defogger wire 1), as well as a conventional wire.

As described in details above, according to the present invention, a branch circuit of low impedance is connected at a position corresponding to the node of a standing wave. Therefore, a series of remarkable effects can be properly achieved, including:

1. that the effects of noise suppression are remarkable, completely free from adversely affecting the normal functions of an electric wire,
2. that the noise suppressor is simple in construction, low in cost, and superb in vibration resistance and in impact resistance as well,
3. that a frequency band having the proper effects of noise suppression can be selected readily enough, by changing the length of a conductor and/or the location of the connection thereof, and by arranging the noise trap wire along the original line,
4. the noise suppressor can be caused to be handled readily enough, completely free from any restriction whatsoever in terms of the assembly thereof,
5. an adverse effect of a high-frequency current on other wires or the like can be mitigated by causing the phases of the high-frequency currents running through two wires to act in a manner counteract each other.

Furthermore, by arranging two or more noise trap wires, 6. the effects of noise suppression can be improved to an even higher level,
7. an effectively noise-suppressed frequency band can be expanded, and
8. the degree of precision of the fitting position can be lowered, thus eliminating a restriction involved in the manufacturing processes.

What is claimed is:

1. A wire transmission noise suppressor for a vehicle including an electrical circuit wherein a standing wave of current is formed, comprising a branch circuit of low impedance connected to said electrical circuit at a position corresponding to a node of a standing wave, said branch circuit being a noise trap wire having an open circuit end and a length of about $$\lambda/4 + \lambda 2 \times n, (n = 0, 1, 2 \ldots),$$

wherein the current is a high frequency signal and $\lambda$ is the wavelength of the signal, said noise trap wire being arranged along said electrical circuit toward the side from which the high frequency current is generated.

2. A wire transmission noise suppressor as claimed in claim 1 wherein said noise suppressor further comprises a second branch circuit connected to said electrical circuit at a position of about $\lambda/4$ from said branch circuit, wherein the current is a high frequency signal and $\lambda$ is the wavelength of the signal.

3. A wire transmission noise suppressor as in claim 2 wherein said second branch circuit is arranged along said electrical circuit toward the side from which the high frequency current is generated.

4. A wire transmission noise suppressor for a vehicle comprising:
   a. a defogger circuit including a defogger heating wire positioned on a rear window of the vehicle and connected to a power source through a switch by a connecting wire;
   b. an antenna connected to an FM radio, and positioned on said rear window together with said defogger hearing wire; and
   c. a noise trap wire connected to said connecting wire at the position of about 60 cm from the junction of said connecting wire with said defogger heating wire and having an open-circuited end and a length of about 60 cm, thereby preventing high-frequency currents about 100 MHz from running into said FM antenna through said defogger heating wire.

5. A wire transmission noise suppressor as claimed in claim 4 wherein said noise trap wire is taped together with said connecting wire at the side of said power source 6. A wire transmission noise suppressor for a vehicle comprising:
   a. a defogger circuit including a defogger heating wire positioned on a rear window of the vehicle and connected to a power source through a switch by a connecting wire;
   b. an antenna connected to an FM radio and, positioned on said rear window together with said defogger heating wire; and
   c. a noise trap wire connected to said connecting wire at the position of about $\lambda/4 + \lambda/2 \times n$, ($n + 0, 1, 2, \ldots$) from the junction of said connecting wire with said defogger heating wire and having an open-circuited end and a length of about $\lambda/4 + \lambda/2 \times n$, ($n = 1, 2, 3, \ldots$), wherein the current is a high frequency signal and $\lambda$ is the wavelength of the signal, thereby preventing said high frequency signals from running into said FM antenna through said defogger heating wire.

7. A wire transmission noise suppressor as claimed in claim 6 wherein said noise trap wire is arranged along said connecting wire toward the side from which said power source is connected.

* * * * *